US008700516B2

(12) United States Patent
Bell et al.

(10) Patent No.: US 8,700,516 B2
(45) Date of Patent: Apr. 15, 2014

(54) METHODS AND APPARATUS FOR IMPROVING FACTOR RISK MODEL RESPONSIVENESS

(75) Inventors: Simon Wannasin Bell, Hove (GB); Frank Pak-Ho Siu, Hong Kong (CN)

(73) Assignee: Axioma, Inc., New York, NY (US)

( * ) Notice: Subject to any disclaimer, the term of this patent is extended or adjusted under 35 U.S.C. 154(b) by 0 days.

(21) Appl. No.: 13/503,698

(22) PCT Filed: May 19, 2011

(86) PCT No.: PCT/US2011/037231
§ 371 (c)(1),
(2), (4) Date: Apr. 24, 2012

(87) PCT Pub. No.: WO2012/102749
PCT Pub. Date: Aug. 2, 2012

(65) Prior Publication Data
US 2013/0297530 A1    Nov. 7, 2013

Related U.S. Application Data

(60) Provisional application No. 61/435,439, filed on Jan. 24, 2011.

(51) Int. Cl.
*G06Q 40/06* (2012.01)
*G06Q 40/00* (2012.01)
*G06Q 40/04* (2012.01)
*G06Q 40/08* (2012.01)

(52) U.S. Cl.
USPC ............... 705/36 R; 705/35; 705/38; 703/2; 235/385

(58) Field of Classification Search
CPC ..... G06Q 40/06; G06Q 40/00; G06Q 40/025; G06Q 40/04; G06Q 40/08
USPC ............. 705/36 R, 38, 5, 35; 703/2; 235/385; 375/219
See application file for complete search history.

(56) References Cited

U.S. PATENT DOCUMENTS

| | | | |
|---|---|---|---|
| 7,072,863 B1 * | 7/2006 | Phillips et al. | 705/36 R |
| 7,454,377 B1 * | 11/2008 | Beaumont | 705/36 T |
| 7,644,863 B2 * | 1/2010 | Chen et al. | 235/385 |
| 2002/0123953 A1 * | 9/2002 | Goldfarb et al. | 705/36 |
| 2003/0110016 A1 * | 6/2003 | Stefek et al. | 703/2 |
| 2003/0195830 A1 * | 10/2003 | Merkoulovitch et al. | 705/36 |
| 2003/0225662 A1 * | 12/2003 | Horan et al. | 705/36 |
| 2003/0225663 A1 * | 12/2003 | Horan et al. | 705/36 |
| 2003/0233302 A1 * | 12/2003 | Weber et al. | 705/36 |
| 2004/0078319 A1 * | 4/2004 | Madhavan et al. | 705/38 |

(Continued)

OTHER PUBLICATIONS

Clarke et al., Know Your VMS Exposure, The Journal of Portfolio Management, vol. 36, No. 2, www.iijpm.com, Winter 2010.*

(Continued)

*Primary Examiner* — Barbara Joan Amelunxen
(74) *Attorney, Agent, or Firm* — Law Offices of Peter H. Priest, PLLC

(57) ABSTRACT

Construction of factor risk models that better predict the future volatility of returns of a portfolio of securities such as stocks, bonds, or the like is addressed. More specifically, improved factor-factor covariance estimation is made even when the covariances change rapidly over time. Methods and techniques for achieving better accuracy, responsiveness, and stability of factor risk models are addressed.

11 Claims, 12 Drawing Sheets

(56) References Cited

U.S. PATENT DOCUMENTS

| | | | |
|---|---|---|---|
| 2004/0215551 A1* | 10/2004 | Eder | 705/38 |
| 2006/0253360 A1* | 11/2006 | Gould | 705/35 |
| 2007/0078746 A1* | 4/2007 | Ciampi et al. | 705/36 R |
| 2007/0244788 A1* | 10/2007 | Ferris | 705/36 R |
| 2008/0065522 A1* | 3/2008 | Diffenderffer | 705/36 R |
| 2008/0183638 A1* | 7/2008 | Chigirinskiy et al. | 705/36 R |
| 2008/0288420 A1* | 11/2008 | Michaud et al. | 705/36 R |
| 2009/0119228 A1* | 5/2009 | Hsu et al. | 705/36 R |
| 2009/0132433 A1* | 5/2009 | Pillai | 705/36 R |
| 2009/0313041 A1* | 12/2009 | Eder | 705/2 |
| 2009/0313180 A1* | 12/2009 | Merkoulovitch et al. | 705/36 R |
| 2010/0017345 A1* | 1/2010 | Hadi et al. | 705/36 R |
| 2010/0332411 A1* | 12/2010 | Rachev et al. | 705/36 R |
| 2011/0004567 A1* | 1/2011 | Madhavan et al. | 705/36 R |
| 2011/0289017 A1* | 11/2011 | Renshaw | 705/36 R |
| 2012/0030137 A1* | 2/2012 | Garcke et al. | 705/36 R |
| 2012/0041898 A1* | 2/2012 | Shah | 705/36 R |
| 2012/0150651 A1* | 6/2012 | Hoffberg et al. | 705/14.58 |
| 2012/0303408 A1* | 11/2012 | Eder | 705/7.28 |

OTHER PUBLICATIONS

Guerard, Jr., John B., Handbook of Portfolio Construction: Contemporary Applications of Markowitz Techniques, Ch. 2, Markowitz and the Expanding Definition of Risk: Applications of Multi-factor Risk Models, pp. 31-60, McKinley Capital Management, LLC, Anchorage, AK.*

* cited by examiner

METHODS AND APPARATUS FOR IMPROVING FACTOR RISK MODEL RESPONSIVENESS

The present application claims benefit of U.S. Provisional Application Ser. No. 61/435,439, file Jan. 24, 2011, which is incorporated by reference herein in its entirety.

FIELD OF INVENTION

The present invention relates generally to the estimation of the risk, or active risk, of an investment portfolio using factor risk models. More particularly, it relates to improved computer based systems, methods and software for more accurate estimation of the risk or active risk of an investment portfolio. The invention addresses techniques allowing a factor risk model's risk estimates to be more accurate, more stable, and more responsive.

BACKGROUND OF THE INVENTION

Financial time series analysis often assumes that the statistical properties of equity returns do not vary over time. However, the statistical properties of actual returns data from financial markets do vary over time. In particular, empirical evidence suggests that volatility or risk, the square root of the variance of returns, changes with time. FIG. 1 shows a plot of both predicted risk 202 from a global factor risk model and one month forward looking realized risk 200 for a broad global benchmark portfolio. The one month, realized forward looking risk 200 changes over time. Even within relatively short time intervals, such as a few weeks, the realized risk is not constant, exhibiting intermittent spikes of both modest and large magnitude as well as fluctuating noticeably. During periods of market turmoil, such as late 2008, volatility surges from a low value varying between 10% and 20% annual volatility to over 70% annual volatility in a matter of one or two months.

The challenge for commercial risk model vendors is to produce risk models that predict future volatility, or, in other words, accurately predicting the realized risk 200 shown in FIG. 1. The quality of risk model predictions can be measured with respect to at least three metrics:

1. Prediction Accuracy. The difference between the realized and predicted volatilities.
2. Stability. The risk model predictions should not exhibit the smaller, transient changes observed in realized risk. In other words, the risk predictions should be smoother than the realized risk. Such smoothness ensures that portfolio rebalancing and risk management decisions are not driven by market transients of shorter duration than the investment holding horizon.
3. Responsiveness. When the overall level of market volatility rises or falls, the predicted risk should respond similarly with as little time lag in the response as possible.

Stability and responsiveness both bear on how changes in realized risk are tracked by risk model predictions. On the one hand, stability requires that smaller, temporary changes in realized volatility should not appear in the risk model predictions. On the other hand, responsiveness requires that larger, sustained changes in realized volatility should appear. Thus smaller changes are interpreted as noise that should not affect investment decisions while the larger changes are interpreted as meaningful changes that can and should affect investment decisions. The difference between smaller and larger changes or temporary and sustained changes depends, of course, on the manner in which the risk model is used. A portfolio manager who trades every day may consider a weeklong change in realized volatility a sustained change that should be captured by a high quality risk model, while a portfolio manager who invests over a time horizon of months may consider a weeklong change in realized volatility a temporary effect that should be filtered out of a high quality risk model. In both cases, the portfolio manager wants to react to meaningful changes in market volatility that cause material changes to his or her investment decisions while simultaneously avoiding any overreaction to temporary, noisy market conditions that may lead to unnecessary trading. Stability seeks to ensure that the risk model predictions are smooth over a sufficiently long period of time, while responsiveness seeks to ensure that the risk model predictions change and respond to market changes in volatility over a sufficiently short period of time.

In FIG. 1, risk model accuracy is measured by the difference between the realized risk 200 and the predicted risk 202. Stability is measured by the fact that the predicted risk 202 is smoother than the realized risk 200. Responsiveness is determined by how well the predicted risk 202 tracks the realized risk 200 when the overall level of volatility changes.

In FIG. 1, the predicted risk 202 is reasonably accurate during the early years of the decade and from 2006 to 2009. However, it is less accurate in reducing the predicted volatility from 2003 to 2006, when market volatility drops to a historic low, remaining low for several years. In particular, the gap 201 between the predicted and realized risk in 2003, indicated by the arrows, is more than 5% throughout most of 2003, and the gap 203 between the predicted and realized risk in 2009, indicated by the arrows, is more than 10% throughout most of 2009. Approximately twenty-four months elapse starting from the beginning of 2003 when market volatility falls before the predicted and realized volatilities are at the same level. Similarly, the predictions throughout 2009 are significantly higher than the realized volatility. More particularly, gaps 201 and 203 are larger than desirable.

There are several well known mathematical modeling techniques for estimating the risk of a portfolio of financial assets such as securities and for deciding how to strategically invest a fixed amount of wealth given a large number of financial assets in which to potentially invest.

For example, mutual funds often estimate the active risk associated with a managed portfolio of securities, where the active risk is the risk associated with portfolio allocations that differ from a benchmark portfolio. Often, a mutual fund manager is given a "risk budget", which defines the maximum allowable active risk that he or she can accept when constructing a managed portfolio. Active risk is also sometimes called portfolio tracking error. Portfolio managers may also use numerical estimates of risk as a component of performance contribution, performance attribution, or return attribution, as well as, other ex-ante and ex-post portfolio analyses. See for example, R. Litterman, Modern Investment Management: An Equilibrium Approach, John Wiley and Sons, Inc., Hoboken, N.J., 2003 (Litterman), which gives detailed descriptions of how these analyses make use of numerical estimates of risk and which is incorporated by reference herein in its entirety.

Another use of numerically estimated risk is for optimal portfolio construction. One example of this is mean-variance portfolio optimization as described by H. Markowitz, "Portfolio Selection", Journal of Finance 7(1), pp. 77-91, 1952 which is incorporated by reference herein in its entirety. In mean-variance optimization, a portfolio is constructed that minimizes the risk of the portfolio while achieving a minimum acceptable level of return. Alternatively, the level of return is maximized subject to a maximum allowable portfolio risk. The family of portfolio solutions solving these optimization problems for different values of either minimum acceptable return or maximum allowable risk is said to form an "efficient frontier", which is often depicted graphically on a plot of risk versus return. There are numerous, well known, variations of mean-variance portfolio optimization that are used for portfolio construction. These variations include methods based on utility functions, Sharpe ratio, and value at risk.

Suppose that there are N assets in an investment portfolio and the weight or fraction of the available wealth invested in each asset is given by the N-dimensional column vector w. These weights may be the actual fraction of wealth invested or, in the case of active risk, they may represent the difference in weights between a managed portfolio and a benchmark portfolio as described by Litterman. The risk of this portfolio is calculated, using standard matrix notation, as $$V = w^T Q w \qquad (1)$$

where V is the portfolio variance, a scalar quantity, and Q is an N×N positive semi-definite matrix whose elements are the variance or covariance of the asset returns. Risk or volatility is given by the square root of V.

The individual elements of Q are the expected covariances of security returns and are difficult to estimate. For N assets, there are N(N+1)/2 separate variances and covariances to be estimated. The number of securities that may be part of a portfolio, N, is often over one thousand, which implies that over 500,000 values must be estimated. Risk models typically cover all the assets in the asset universe, not just the assets with holdings in the portfolio, so N can be considerably larger than the number of assets in a managed or benchmark portfolio.

To obtain reliable variance or covariance estimates based on historical return data, the number of historical time periods used for estimation should be of the same order of magnitude as the number of assets, N. Often, there may be insufficient historical time periods. For example, new companies and bankrupt companies have abbreviated historical price data and companies that undergo mergers or acquisitions have non-unique historical price data. As a result, the covariances estimated from historical data can lead to matrices that are numerically ill conditioned. Such covariance estimates are of limited value.

Factor risk models were developed, in part, to overcome these short comings. See for example, R. C. Grinold, and R. N. Kahn, Active Portfolio Management: A Quantitative Approach for Providing Superior Returns and Controlling Risk, Second Edition, McGraw-Hill, New York, 2000, which is incorporated by reference herein it its entirety, and Litterman.

Factor risk models represent the expected variances and covariances of security returns using a set of M factors, where M is much less than N, that are derived using statistical, fundamental, or macro-economic information or a combination of any of such types of information. Given exposures of the securities to the factors and the covariances of factor returns, the covariances of security returns can be expressed as a function of the factor exposures, the covariances of factor returns, and a remainder, called the specific risk of each security. Factor risk models typically have between 20 and 80 factors. Even with 80 factors and 1000 securities, the total number of values that must be estimated is just over 85,000, as opposed to over 500,000.

In a factor risk model, the covariance matrix Q is modelled as $$Q = B^T \Sigma B + \Delta^2 \qquad (2)$$

where B is an N×M matrix of factor exposures, $\Sigma$ is an M×M matrix of factor-factor covariances, and $\Delta^2$ is a matrix of specific variances. Normally, $\Delta^2$ is assumed to be diagonal.

The factor-factor covariance matrix $\Sigma$ is typically estimated from a time series of historical factor returns, $f_t$, for each of the M factors, while the specific variances are estimated from a time series of historical specific returns.

Risk models used in quantitative portfolio management partly address the issues of stability and responsiveness when predicting time varying volatility by relying on an exponentially weighted covariance estimator since this estimator places greater emphasis on current observations, implicitly assuming that the most recent subset of return values often vary around a constant value. The returns can be asset returns, or they may be factor returns or specific returns used for estimating a risk model covariance. Given a time series of T returns $\{r_t, r_{t-1}, r_{t-2}, \ldots, r_{t-T+1}\}$, we form the weighted returns series $\{\tilde{r}_t\}$ $$\{\tilde{r}_t\} = \{(w_t, r_t), (w_{t-1}, r_{t-1}), \ldots, (w_{t-T+1}, r_{t-T+1})\} \qquad (3)$$

$$w_{t-k} = 2^{-k/H}, k = 0, \ldots, T-1 \qquad (4)$$

where H is the half-life parameter. The exponentially weighted covariance estimator gives $$E[\text{var}(r_{t+1})|_t] \equiv \hat{\sigma}_{t+1}^2 = \text{var}(\tilde{r}_t) \qquad (5)$$

This is frequently seen expressed in the RiskMetrics™ specification in which the half-life is reformulated as a decay factor $\lambda$. See, for example, J. Longerstaey and M. Spencer, Risk-Metrics™—Technical Document, Morgan Guaranty Trust Company, New York, 4th ed., 1996, which is incorporated by reference herein it its entirety. Equation (5) can be rewritten as:

$$\hat{\sigma}_{t+1}^2 = \lambda \sigma_t^2 + (1-\lambda) r_t^2 \qquad (6)$$

Ease and speed of computation, robustness, and parsimony have largely been responsible for the widespread adoption of exponentially weighted covariance estimates in commercial risk models. Exponential weighting generally improves the accuracy of the risk model.

However, when realized risk changes rapidly, the risk predictions of risk models using exponentially weighted covariance estimates often lag realized risk changes over considerable periods of time. In other words, exponential weighting does not always lead to the desired level of responsiveness in a risk model. This lag is shown in FIG. 1 during 2003 by gap 201 and 2009 by gap 203, for example. The predicted risk in FIG. 1 202 is computed from a risk model that uses exponential weighting with a 125-day half life for volatility estimation and a 250-day half-life for correlations. A larger half life is used for the correlation estimation in order to ensure a stable estimate.

One problem with exponentially weighted covariance estimates recognized and addressed by the present invention is that large returns have a disproportionate effect on the covariance estimate even with exponential weighting. These large returns can inflate risk estimates, and they impact risk estimates for very long times, resulting in lagged risk predictions, especially when volatility falls from a high level, such as shown by gap 201 in 2003 and gap 203 in 2009.

In order to produce stable risk predictions, risk models typically require a long history of data for the covariance estimate. The longer the data history, however, the more likely it is that the return history will span a time period over which the volatility of the older returns is at a substantially different level than the volatility of the recent returns. Although the exponentially weighted covariance estimate will give the older return data less weight than the most recent returns, the resulting volatility forecast may noticeably lag, in other words, not be as responsive to the realized volatility results as desired, if the volatility of the older return data is substantially different than the volatility of the more recent return data.

One approach to the problem of lagging risk model predictions is to use shorter data histories and/or aggressive decay factors in order to reduce the influence of the older data on the forecasts. However, if the data history is too short or the decay factors too aggressive, the stability of the risk model predictions may be jeopardized.

Other methods besides more aggressive half-lives have been proposed to address the issue of non-stationarity of asset returns, factor returns, and specific returns. For example, generalized autoregressive conditional heteroskedasticity (GARCH,) models have been proposed. See, for example, Tim Bollerslev, "Generalized Autoregressive Conditional Heteroskedasticity", Journal of Econometrics, 31:307-327, 1986, which is incorporated by reference herein it its entirety. However, GARCH models normally produce risk models that are too unstable for use in commercial risk models.

SUMMARY OF THE INVENTION

The present invention recognizes that the lag in responding to rapidly changing market volatility in 2003 and 2009 can be improved upon when compared with the responsiveness to existing risk models. One aspect of the present invention is to provide a methodology for improving risk model responsiveness with minimal negative impact on both the risk model accuracy and stability. In some cases, as addressed further below, the accuracy and stability may also be improved.

One goal of risk model prediction in accordance with the present invention, then, is to obtain a smooth curve of predicted risks that closely tracks the realized risk but that does not exhibit lags when the overall level of volatility changes substantially. Exponential weighting alone does not solve the problem, nor does the use of shorter data histories or more aggressive decay factors.

Another goal of the present invention is to improve responsiveness of the predicted risk without substantially increasing the change in forecast risk from one period to another.

Another aspect of the present invention is to improve risk model responsiveness over long periods of time.

Among its several aspects, the present invention addresses three things: (1), improving the responsiveness of the risk model; (2) maintaining the same level of stability found in traditional risk models, where stability is measured using the change in month-to-month predicted risk; and (3), maintaining accurate risk predictions over long periods of time during which the overall level of market volatility may or may not change substantially.

DETAILED DESCRIPTION

The present invention may be suitably implemented as a computer based system, in computer software which is stored in a non-transitory manner and which may suitably reside on computer readable media, such as solid state storage devices, such as RAM, ROM, or the like, magnetic storage devices such as a hard disk or floppy disk media, optical storage devices, such as CD-ROM or the like, or as methods implemented by such systems and software.

Figure 2:
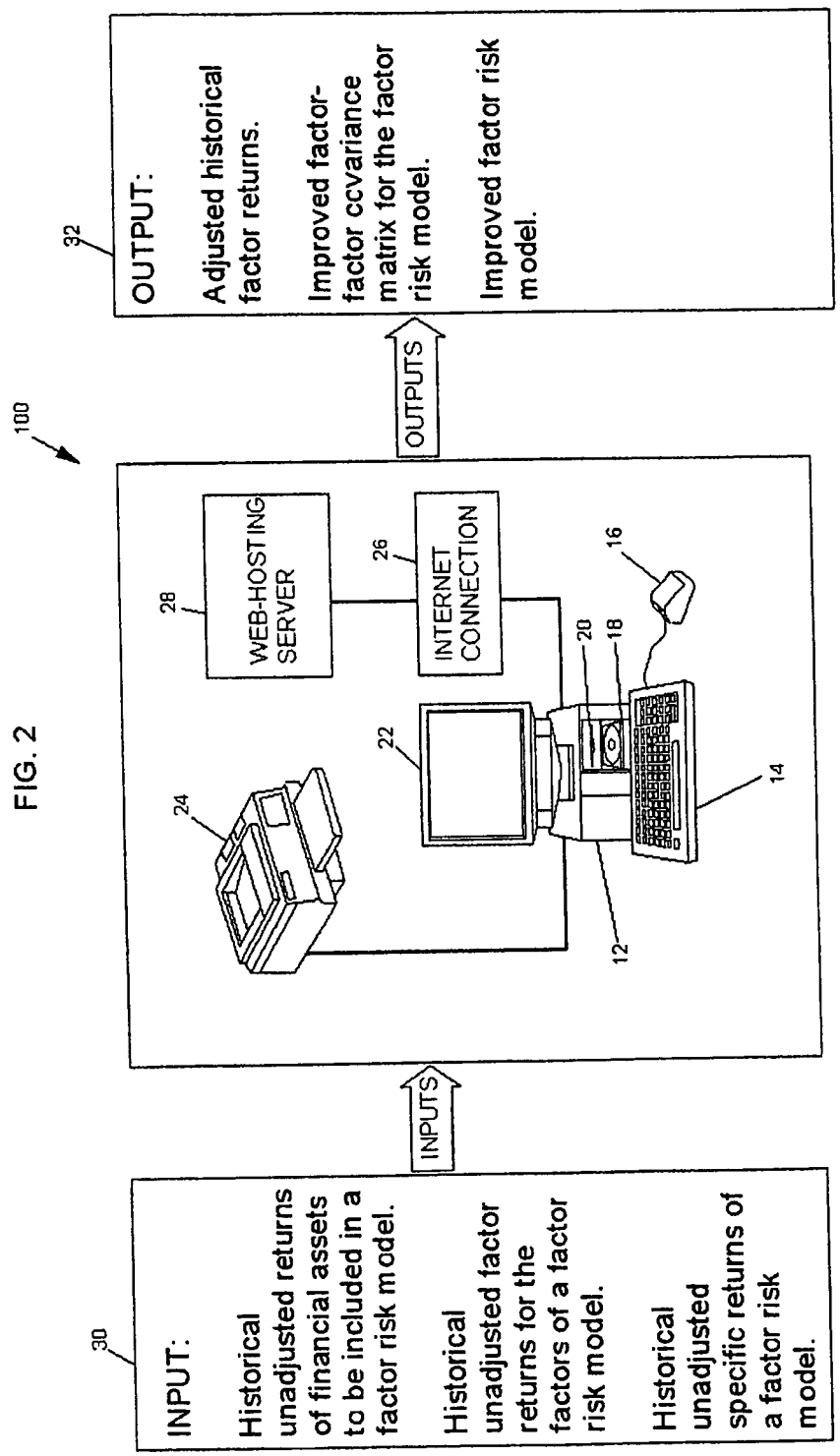
FIG. 2 shows a computer based system which may be suitably utilized to implement the present invention.

FIG. 2 shows a block diagram of a computer system 100 which may be suitably used to implement the present invention. System 100 is implemented as a computer 12 including one or more programmed processors, such as a personal computer, workstation, or server. One likely scenario is that the system of the invention will be implemented as a personal computer or workstation which connects to a server 28 or other computer through an Internet or other network connection 26. In this embodiment, both the computer 12 and server 28 run software that when executed enables the user to input instructions and calculations on the computer 12, send the input for conversion to output at the server 28, and then display the output on a display, such as display 22, or is printed out, using a printer, such as printer 24, connected to the computer 12. The output could also be sent electronically through the Internet connection 26. In another embodiment of the invention, the entire software is installed and runs on the computer 12, and the Internet connection 26 and server 28 are not needed. In still a further embodiment, the Internet connection is replaced with a local area network. As shown in FIG. 2 and described in further detail below, the system 100 includes software that is run by the central processing unit of the computer 12. The computer 12 may suitably include a number of standard input and output devices, including a keyboard 14, a mouse 16, CD-ROM drive 18, disk drive 20, monitor 22, and printer 24. It will be appreciated, in light of the present description of the invention, that the present invention may be practiced in any of a number of different computing environments without departing from the spirit of the invention. For example, the system 100 may be implemented in a network configuration with individual workstations connected to a server. Also, other input and output devices may be used, as desired. For example, a remote user could access the server with a desktop computer, a laptop utilizing the Internet or with a wireless handheld device such as an IPad™, IPhone™, IPod™, Blackberry™, Treo™, or the like.

One embodiment of the invention has been designed for use on a stand-alone personal computer running in Windows (Microsoft XP, Vista, Windows 7). Another embodiment of the invention has been designed to run on a Linux-based server system.

According to one aspect of the invention, it is contemplated that the computer 12 will be operated by a user in an office, business, trading floor, classroom, or home setting.

As illustrated in FIG. 2, and as described in greater detail below, the inputs 30 may suitably include historical unadjusted returns of the financial assets to be included in a factor risk model; historical unadjusted factor returns for the factors of a factor risk model; and historical, unadjusted specific returns of a factor risk model.

As further illustrated in FIG. 2, and as described in greater detail below, the system outputs 32 may suitably include adjusted historical factor returns; an improved factor-factor covariance matrix for the factor risk model; and an improved factor risk model.

The output information may appear on a display screen of the monitor 22 or may also be printed out at the printer 24. The output information may also be electronically sent to an intermediary for interpretation. For example, risk predictions for many portfolios can be aggregated for multiple portfolio or cross-portfolio risk management. Or, alternatively, trades based, in part, on the factor risk model predictions, may be sent to an electronic trading platform. Other devices and techniques may be used to provide outputs, as desired.

With this background in mind, we turn to a detailed discussion of the invention and its context. The invention is herein referred to as Dynamic Volatility Adjustment (DVA). DVA seeks to find a weighting scheme for historical returns that transforms them so that they more closely resemble a weakly stationary time-series. In the discussion that follows, algorithms may be suitably implemented as software stored in memory and executed by a processor or processors in computer 12. Data may be input by a user or retrieved from a database or other storage. Data entered by a user may be entered using a keyboard, mouse, touchscreen display or other data entry device or means. Output data may be printed by a printer, displayed by a display, transmitted over the network to another user or users, or otherwise output utilizing an output device or means. Equity returns $r_t$ are weakly stationary when the first two moments of their distributions are stationary:

$$E[r_t] = \mu \quad (7)$$

$$\text{cov}(r_t, r_{t-\tau}) = \gamma_\tau \quad (8)$$

for any $\tau$ where we assume that $r_t$ and $t_{t-\tau}$ have finite and time invariant first and second moments, and that these values only depend on $\tau$. When $\tau=0$, equation (8) becomes variance, which is often used as a measure of market volatility. Weak stationarity is a handy condition because it allows inferences and predictions to be made about future returns. See, for example, Ruey Tsay, Analysis of Financial Time Series, John Wiley & Sons Inc., 2005, which is incorporated by reference herein it its entirety.

DVA seeks a weighting scheme for a set of historical factor returns data that transforms its second moment into a weakly stationary statistic. Specific returns are not modified by the DVA algorithm as they are too unstable. Let $f_t$ be the observed time history of factor returns, and $g_t$ be a weighting function to be determined. Weak stationarity of the volatility of $(g_t, f_t)$ requires $$\text{cov}[(g_t f_t), (g_{t-\tau} f_{t-\tau})] = \gamma_\tau \quad (9)$$

For a finite set of T observed returns, $\{f_1, f_2, f_3, f_4, \ldots, f_T\}$, where $f_1$ is the oldest return and $f_T$ is the most recent return, we want the series of weighted returns, $\{(g_1, f_1), (g_2, f_2), (g_3, f_3), (g_4, f_4), \ldots, (g_T, f_T)\}$, to fluctuate with a relatively constant level of variance, computed as $\hat{\sigma}^2 = \text{var}\{(g_1, f_1), (g_2, f_2), (g_3, f_3), (g_4, f_4), \ldots, (g_T, f_T)\}$.

There are many weighting functions $g_t$ that will satisfy weak stationarity of the covariance. As originally formulated, DVA includes the following steps.

First, assume that the T data points can be grouped into N overlapping segments of length K, where $T=(N+1)K/2$, and one final data segment of length K/2. Each segment except the earliest shares half of the points of the segment immediately before it, and each segment except the latest shares half the points of the segment immediately after it. The latest segment is only half the length of the others, and is the 'reference' segment, containing the most recent data. For example, with T=12, N=5, and K=4, we obtain the segments:

$$\{S_1\} = \{f_1, f_2, f_3, f_4\}$$

$$\{S_2\} = \{f_3, f_4, f_5, f_6\}$$

$$\{S_3\} = \{f_5, f_6, f_7, f_8\}$$

$$\{S_4\} = \{f_7, f_8, f_9, f_{10}\}$$

$$\{S_5\} = \{f_9, f_{10}, f_{11}, f_{12}\}$$

$$\{S_6\} = \{f_{11}, f_{12}\} \quad (10)$$

Each segment of historical data is denoted by $\{S_n\}$, n=1, ... N+1, and is used to define a distinct volatility regime. The last segment, $\{S_{N+1}\}$, is referred to as the reference chuck or reference segment. In practice, the values for T, N, and K would be larger than for this simple example. For example, T is often the entire factor return history. For Axioma's US Equity model, there are daily returns going back to Jan. 3, 1995, which is more than 4000 factor returns. For a fundamental factor risk model, T normally corresponds to four years of data, making T=1000. For a statistical factor risk model, T normally corresponds to one year of data, making T=250. K normally corresponds to about 6 months or 125. Hence, N=7 for a fundamental factor risk model and N=3 for a statistical factor risk model. Compute the N mean absolute deviations for each $\{S_n\}$:

$$v_n = \frac{1}{K} \sum_{k \in S_n} |f_i|, n = 1, \ldots 1; v_{N+1} = \frac{1}{K/2} \sum_{i \in S_{N+2}} |f_i| \quad (11)$$

Second, compute the N scaling factors for each $v_n$ $$\delta_n = \frac{v_{N+1}}{v_n}, n = 1, \ldots, N+1. \quad (12)$$

The N+1 scaling factors are clipped to lie within $0.8 \leq \delta_n \leq 1.25$. This prevents the scaling values having too large an impact on the returns, which improves stability. This potentially adversely affects the stationarity of the resulting time series, but is imposed for the sake of model stability and robustness to noisy data.

Third, assume a piecewise constant approximation of the N+1 scaling factors $\delta_n$ to compute the T weighting values $g_t$. That is $$g_T = g_{T-1} = \ldots = g_{T-K/2+1} = \delta_{N+1} = 1$$

$$g_{T-k/2} = g_{T-K/2-1} = \ldots = g_{T-K+1} = \delta_N$$

$$g_{T-K} = g_{T-K-1} = \ldots = g_{T-3K/2+1} = \delta_{N-1} \quad (13)$$

Since $\delta_{N+1} \equiv 1$, we have $g_T = 1$ so that the most recently observed return is unchanged when weighted.

Figure 3:
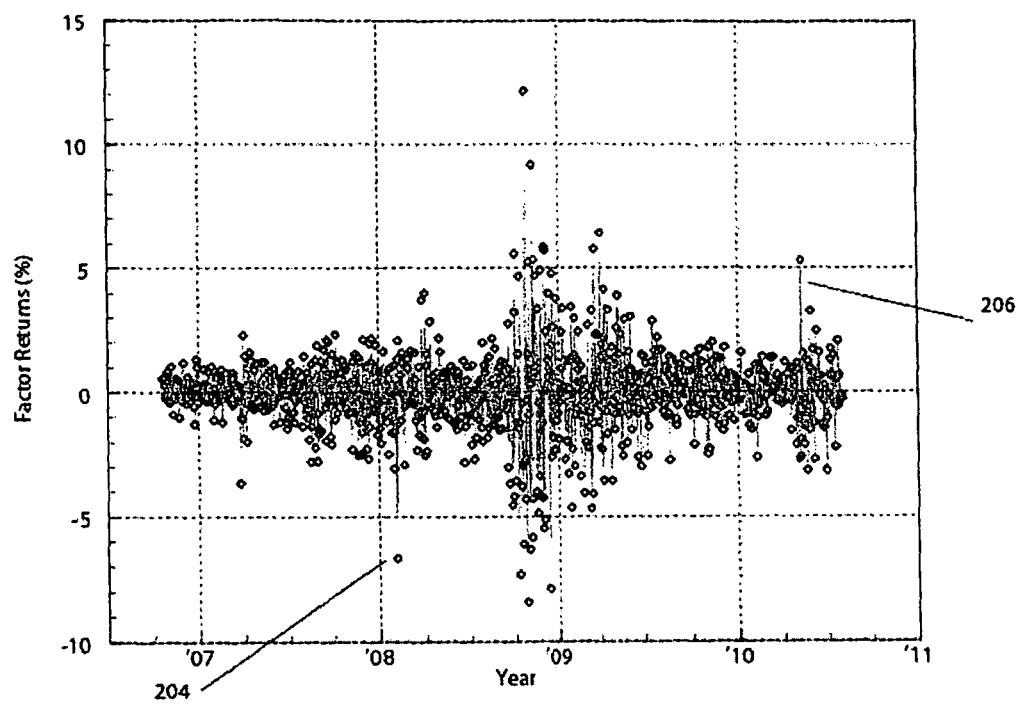
FIG. 3 illustrates unsealed and scaled factor returns corresponding to a global, fundamental factor risk model being estimated in July 2010.

FIG. 3 shows both unscaled factor returns, $f_t$, 204 as individual points and scaled returns, $g_t f_t$, 206 drawn as a thin line for a time series of returns for a global fundamental factor risk model from October 2006 to July 2010. The weighting scheme shown is for July 2010. FIG. 3 shows that, for July 2010, the historical factor returns are adjusted to slightly smaller values during most of 2008 in order for those returns to have the same level of volatility as in July 2010. This is clear from the fact that several of the unscaled factor returns points 204 are much greater than or less than the scaled factor returns 206.

Figure 1:
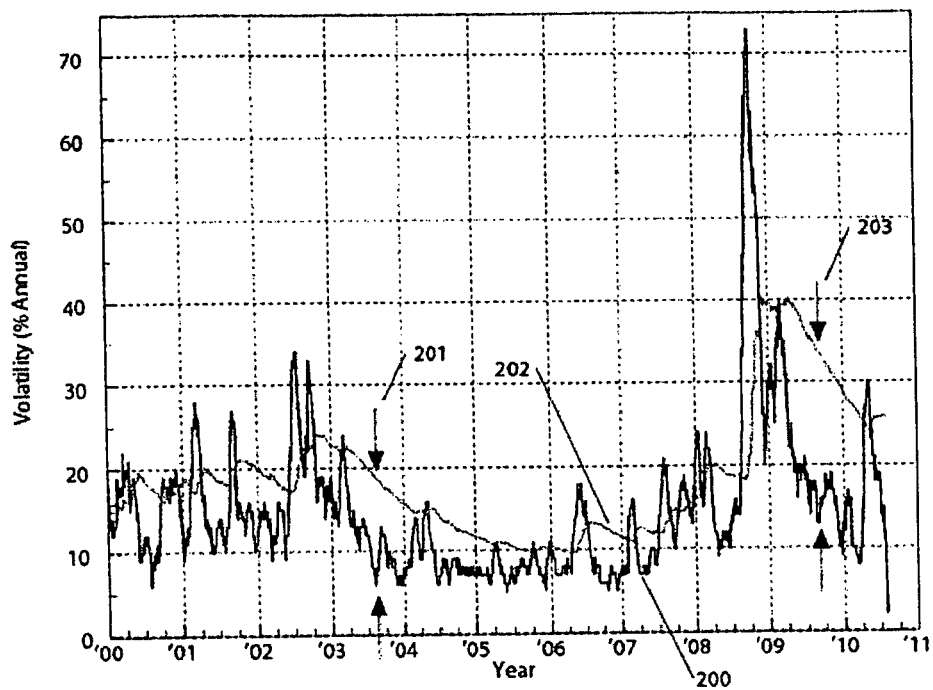
FIG. 1 illustrates predicted versus realized risk for a broad global portfolio from 2000 to 2010.
Figure 4:
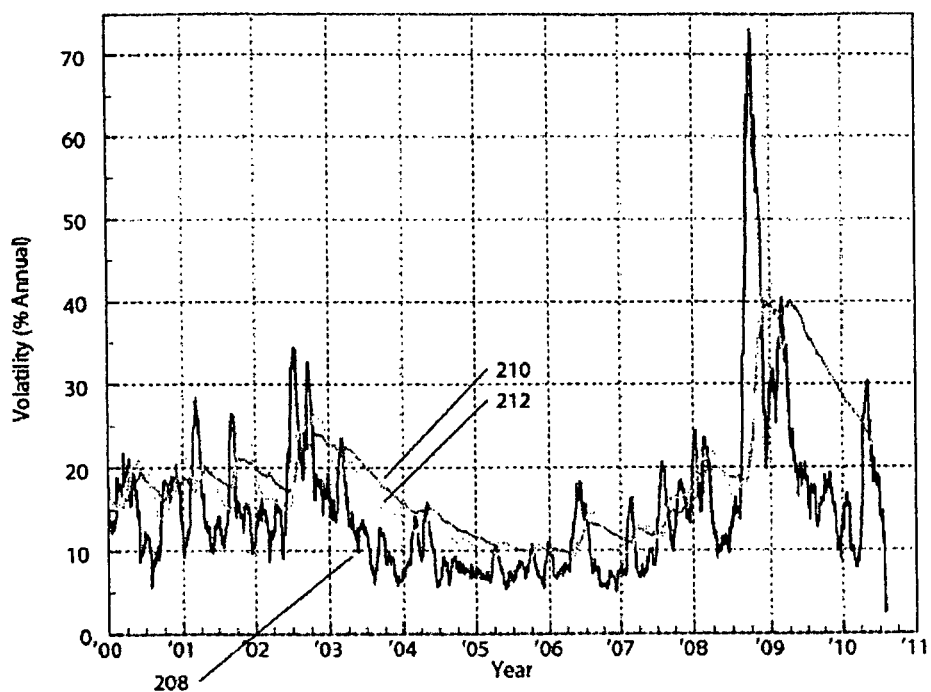
FIG. 4 illustrates predicted versus realized risk of a broad global benchmark portfolio from 2000-2010.
Figure 5:
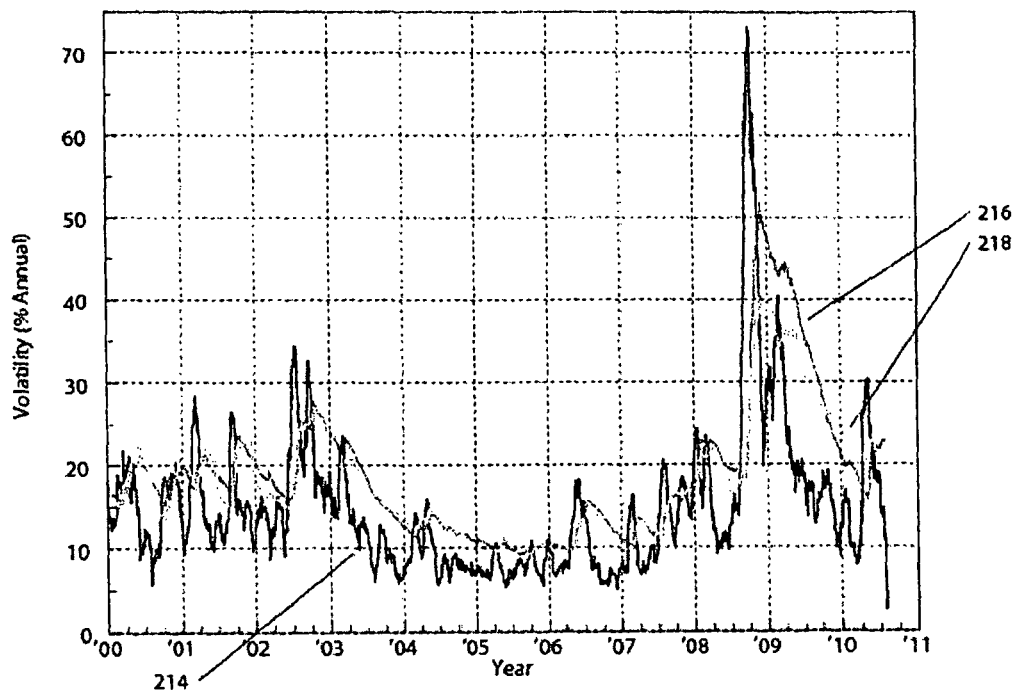
FIG. 5 illustrates risk comparison for the broad global benchmark portfolio from 2000-2009.
Figure 6:
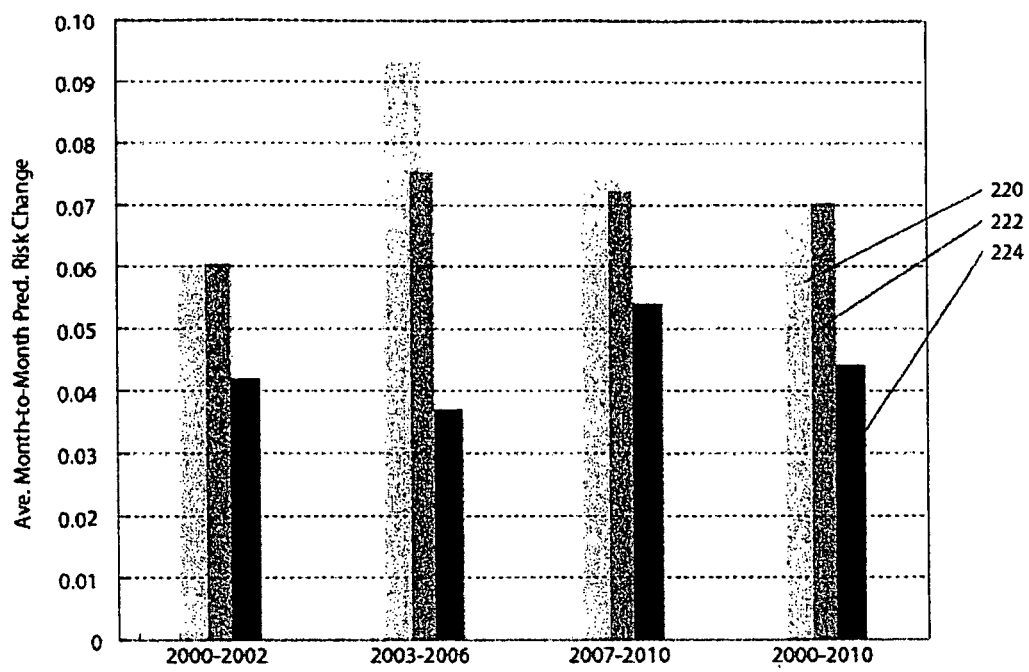
FIG. 6 illustrates average month-to-month predicted risk change for three different risk models.

The advantages of DVA can be seen in the results shown in FIGS. 4, 5, and 6. FIG. 4 revisits FIG. 1 and compares the predicted volatility of a broad global benchmark for the same period, with and without DVA, to the benchmark's realized volatility. FIG. 4 has three lines: the realized risk 208, the predicted risk without DVA 210, and the predicted risk with DVA 212.

In FIG. 4, the overestimation of risk is substantially reduced over 2003 and in 2009 by incorporating DVA. When volatility stays at a constant level for several years, as occurs in 2005-2007, the predictions both with and without DVA converge, as overall levels of volatility become stable for the duration.

FIG. 5 compares a DVA-enabled model with a non-DVA model that uses shorter, more aggressive half-lives. In the shortened half-life model, the half-life for volatility is changed from 125 days to 60 days, while the half-life for correlation is changed from 250 days to 125 days. FIG. 5 shows three lines: realized risk 214, predicted risk without DVA but with a shorter half life 216, and predicted risk with DVA but the standard half life 218.

FIG. 5 shows that DVA yields similar responsiveness, when necessary, to the model with a shorter half-life.

The present invention recognizes, for example, that in FIG. 5 that the DVA 218 and shorter half-life 216 predictions cross each other in mid 2009. In the first half of 2009, the DVA predictions are more accurate, while in the second half of 2009, the shorter half life predictions are more accurate. Thus, the present invention recognizes that DVA as originally proposed could be improved upon particularly with respect to long term accuracy. This is one aspect that the present invention addresses.

Although both the DVA and shorter half life models have comparable responsiveness, the stability of the DVA model is superior to that of the shorter half-life model. FIG. 6 compares the average change in predicted risk from one month to the next for three different risk models over four time periods: 2000-2002; 2003-2005; 2006-2009; and 2000-2009. The three risk models are the original risk model without DVA 224; the risk model with DVA 222; and the risk model with shorter half life 220. The relative change in risk model prediction gives a quantitative measure of the stability of the model. The most stable risk model is the original model, which is also the least responsive. The least stable risk model is the risk model with the shorter half life. The risk model with DVA is as responsive as the shorter half life model, but it has superior stability over three out of four time periods, and is identical for the other one. Hence, the DVA model represents a better trade-off between stability and responsiveness than either of the other risk models.

The present invention addresses a formulation of DVA that improves upon several aspects of the original formulation.

In the original DVA formulation, the weighting values $g_t$ are constant over finite time intervals. The jump that occurs when the weighting values change from one scaling factor, $\delta_n$, to another can lead to undesirable changes in the risk model prediction. In other words, the fact that the weighting values approximate a non-differentiable function can negatively impact the stability of the risk predictions.

In the original formulation of DVA, the length of the reference chunk $\{S_{N+2}\}$ is half that of the other chunks. This makes it difficult to define the reference time horizon of the resulting risk model as the scaling values are defined over data segments of different length.

In the original DVA formulation, scaling values lie within [0.8, 1.25]. Although this ensures a degree of stability, it also means that an older period of excessively high volatility will never be scaled down by a factor of greater than 0.8, no matter how distantly in the past it lies.

In the original DVA formulation, the long term accuracy of the DVA enable risk model may be worse than that of a risk model with a shorter half life, as shown in FIG. 5 over the second half of 2009.

To address these issues, an improved version of DVA incorporates the following improvements. This improved DVA is the preferred embodiment of the invention.

First, rather than segmenting the history of factor returns into N segments of length K and a final segment of length K/2, the history is segmented into only N segments of length K. Hence, with T=12, N=5, and K=4, we obtain the segments:

$$\{S_1\} = \{f_1, f_2, f_3, f_4\}$$

$$\{S_2\} = \{f_3, f_4, f_5, f_6\}$$

$$\{S_3\} = \{f_5, f_6, f_7, f_8\}$$

$$\{S_4\} = \{f_7, f_8, f_9, f_{10}\}$$

$$\{S_5\} = \{f_9, f_{10}, f_{11}, f_{12}\} \quad (14)$$

With this change, the N scaling factors are redefined as $$\delta_n = \frac{v_N}{v_n}, n = 1, \ldots, N. \quad (15)$$

where now $\delta_N = 1$.

Secondly, rather than use a piecewise constant approximation to estimate the weighting values, use cubic spline interpolation on the N scaling factors $\delta_n$ to compute the T weighting values $g_t$ assuming $$g_{T-(n-1)K} = \delta_{N-(n-1)}, n=1, \ldots, N \quad (16)$$

Since $\delta_N = 1$, we have $g_T = 1$ so that the most recently observed return is unchanged when weighted. Unlike the piecewise constant approximation of the original DVA formulation, this approximation varies smoothly and continuously.

Thirdly, rather than clip the scaling values to be within [0.8, 1.25], the requirement that the ratio between any two con secutive scaling factors is no more than 10% is imposed. That is, $$0.9 \le \frac{\delta_n}{\delta_{n-1}} \le 1.1, n = 2, \ldots, N. \quad (17)$$

This ensures stability while simultaneously allowing older time periods of excessively high volatility to be appropriately scaled. It also improves the cubic spline interpolation. If a series of scaling factors is clipped at the same level, then the cubic-spline interpolation oscillates around the clipped value. The 10% figure was chosen empirically to balance responsiveness and stability, and to minimize prediction differences between improved DVA and original DVA during periods of relatively stable volatility. These changes substantially improve the performance of DVA.

FIGS. 7 to 10 compare three variants of risk model predictions to realized, 22-day (one month) volatility for four different benchmarks. The three risk model prediction, variants are original DVA, improved DVA, and a risk model with a shorter half life (60 days for volatilities, 125 days for correlations).

Figure 7:
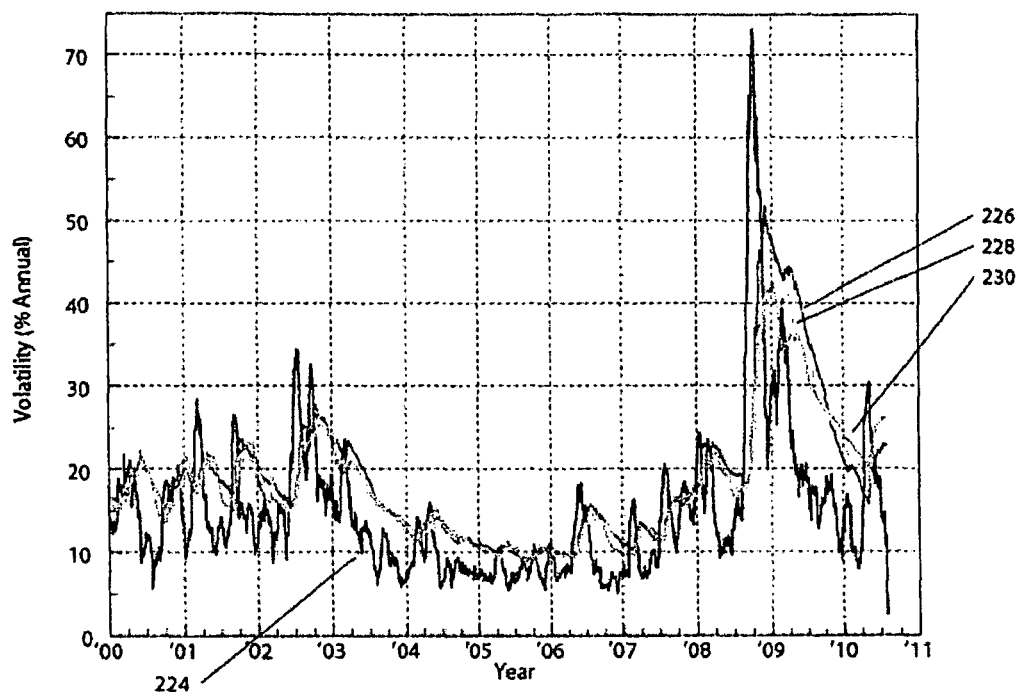
FIG. 7 illustrates total risk of a global benchmark using the three variants of Axioma's global fundamental factor risk model for three risk model variants.

FIG. 7 shows the total realized risk 224 of a global benchmark compared to predictions from three variants of Axioma's global fundamental factor risk model: original DVA 230, the shorter half-life model 226, and the improved DVA 228. The differences between model variants can be seen most clearly from 2008 onwards. The short-term model 226 is the most responsive, as it should be since it has the most aggressive half-life. It overshoots the volatility peak in December 2008 substantially more than the other two models, and then it falls the fastest (from the highest value) throughout 2009. Original DVA 230 is more responsive in early 2009 in that it drops more rapidly during this period than the other variants. However, over the rest of 2009, its predictions actually trend away from market volatility. That is, the accuracy of the original DVA model in 2009 erodes in comparison with the other models. The improved DVA formulation 228 achieves an advantageous trade off in responsiveness and accuracy. Unlike the shorter half-life model, it does not overshoot realized volatility as much in early 2009, and unlike the original DVA, it tracks realized risk more accurately in late 2009. Similar results are obtained for other benchmarks.

Figure 8:
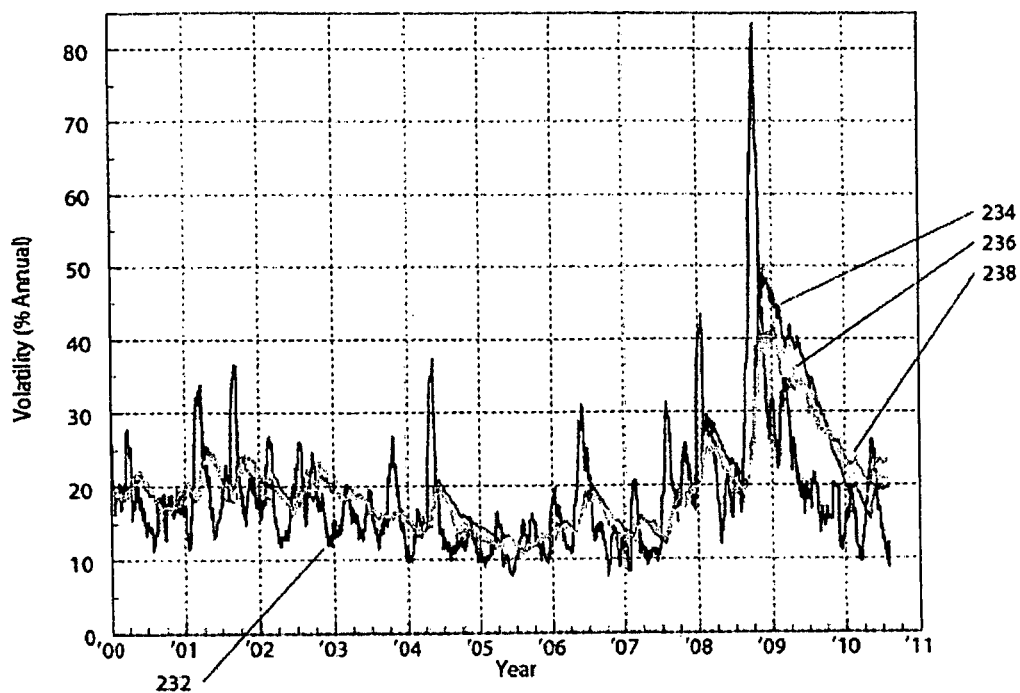
FIG. 8 illustrates total risk of an Asian Pacific benchmark using the three variants of Axioma's global fundamental factor risk model for three risk model variants.

FIG. 8 shows total risk results for an Asian-Pacific benchmark portfolio. There are four lines: realized risk 232; the shorter half life risk prediction 234; the original DVA risk prediction 238; and the improved DVA prediction 236.

Figure 9:
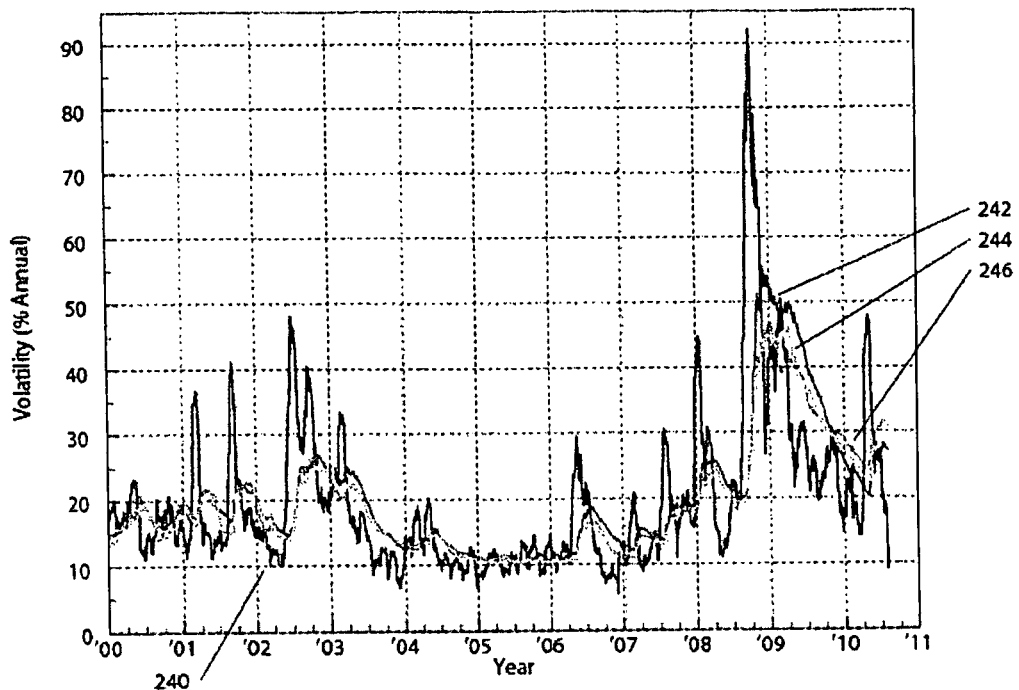
FIG. 9 illustrates total risk of a European benchmark using the three variants of Axioma's global fundamental factor risk model for three risk model variants.

FIG. 9 shows total risk results for a European benchmark. There are four lines: realized risk 240; the shorter half life risk prediction 242; the original DVA risk prediction 246; and the improved DVA prediction 244.

Figure 10:
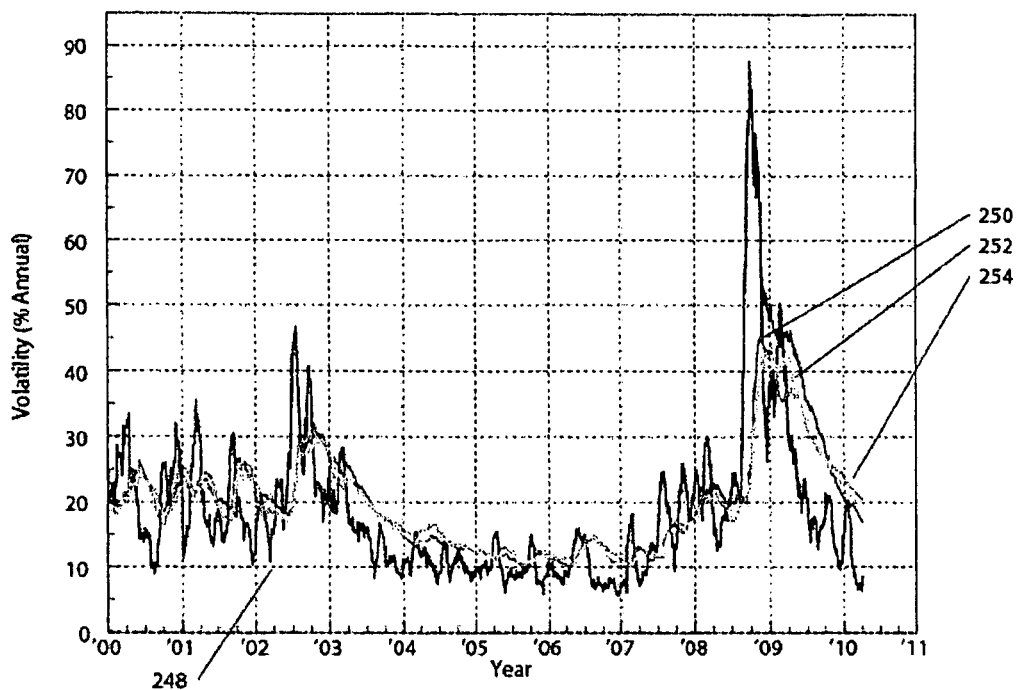
FIG. 10 illustrates total risk of a US benchmark using the three variants of Axioma's global fundamental factor risk model for three risk model variants.

FIG. 10 shows results for a US benchmark. There are four lines: realized risk 248; the shorter half life risk prediction 250; the original OVA risk prediction 254; and the improved DVA prediction 252.

In all cases, the original version of DVA is more responsive in January 2009, but its accuracy erodes over the rest of 2009 in comparison to improved DVA and the shorter half-life model.

Figure 11:
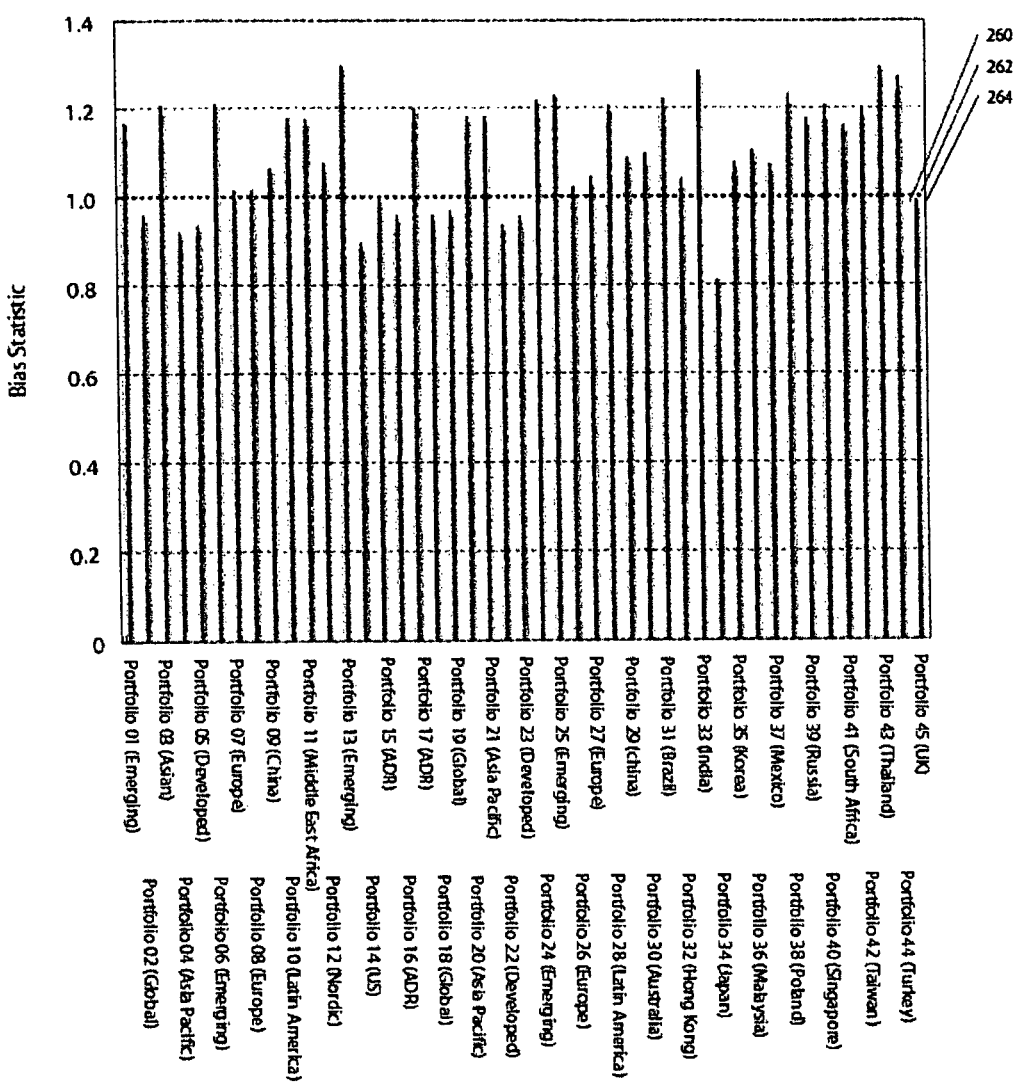
FIG. 11 illustrates bias statistics for 45 different portfolios from 2000 to 2010.

FIG. 11 shows the average bias statistic for 45 different portfolios for the three model variants. The bias statistic is taken over the time from 2000 to 2010 on a monthly basis. For an unbiased risk model, the bias statistic will be close to one. For each of the 45 portfolios, three bars are shown: a light bar on the left 260 representing the shorter half life risk model predictions; a medium bar on the right 264 representing the original DVA predictions; and a dark bar in the center 262 representing the improved DVA predictions. Over the broad range of portfolios shown in FIG. 11, there is no significant difference in the bias statistics of the three different model variants. That is, for each factor, the three bars—original DVA 264, improved DVA 262 and the shorter half-life model 260—are essentially the same.

Figure 12:
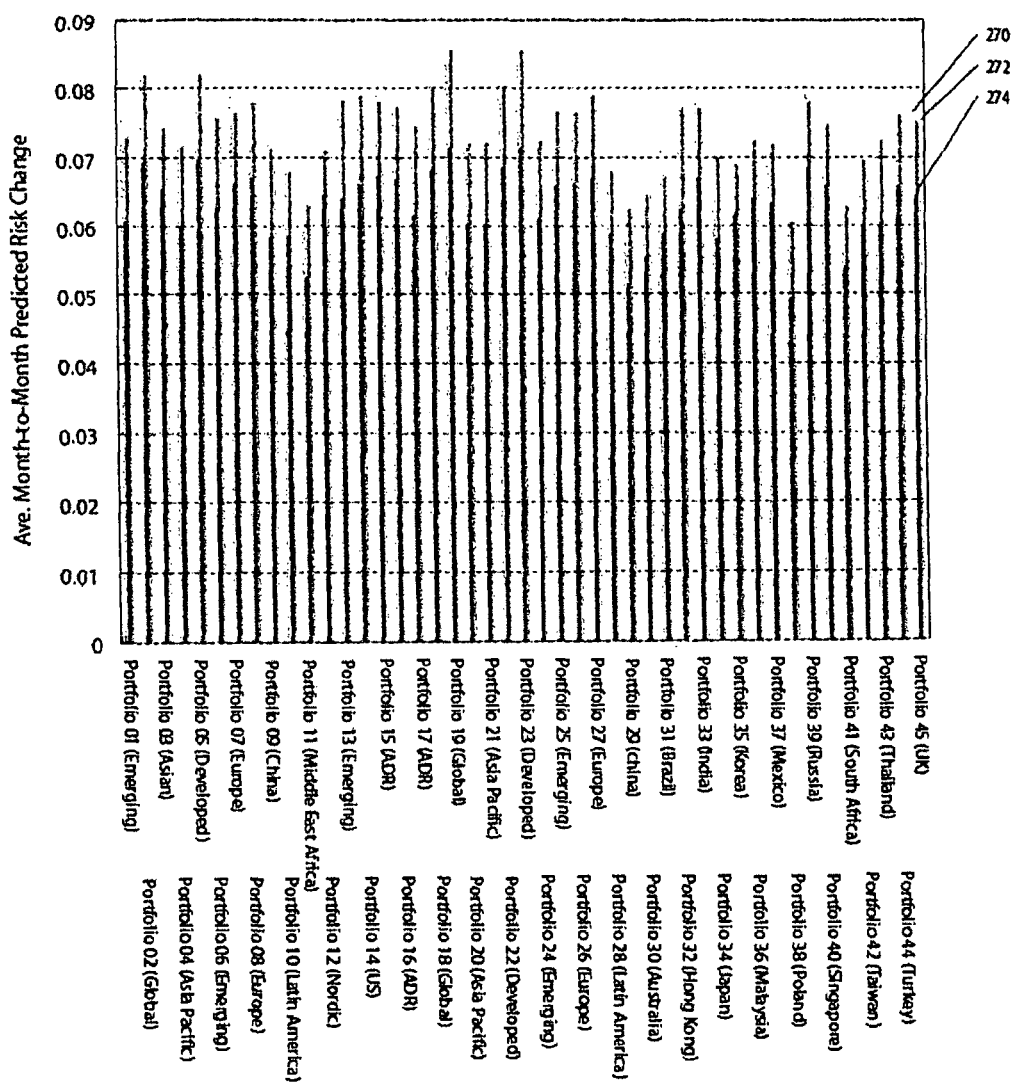
FIG. 12 illustrates the average forecast change for 45 different portfolios for three risk model variants.

However, there are significant differences in the stability of the three model variants. FIG. 12 shows the forecast change statistic for 45 different portfolios Forecast change gives a quantitative measure of the turnover of the risk model predictions, which is closely related to the stability of the risk model.

For each of the 45 portfolios, three bars are shown: a light bar on the left 270 representing the shorter half life risk model predictions; a medium bar on the right 272 representing the original DVA predictions; and a dark bar in the center 274 representing the improved DVA predictions.

The improved DVA model predictions 274 show a clear reduction in forecast change in comparison with both the original DVA model 272 and the shorter half-life model 270. In other words, its forecasts are much smoother, day on day, without losing accuracy. These results show that the improved OVA gives better responsiveness without sacrificing smoothness of forecast.

While the present invention has been disclosed in the context of various aspects of presently preferred embodiments, it will be recognized that the invention may be suitably applied to other environments consistent with the claims which follow.

The invention claimed is:

1. A computer-based method of estimating a factor-factor covariance matrix of a factor risk model comprising:
    storing data for the factors to be included in the factor risk model in a memory, wherein said memory is a non-transitory computer readable media;
    grouping factor returns from a time series history of factor returns to form two or more equal length segments that overlap by a programmed processor cooperating with the memory and with software;
    computing a measure of volatility for each segment by the programmed processor cooperating with the memory and with software;
    computing a segment adjustment factor for all segments by the programmed processor cooperating with the memory and with software such that the segment adjustment factor for each segment is calculated as a ratio of the volatility measure of the most recent segment divided by the volatility measure of the segment;
    computing a factor return adjustment factor for each factor return employing an interpolation approach that generates a continuous interpolation of the segment adjustment factors by the programmed processor cooperating with the memory and with software;
    computing each element of the factor-factor covariance matrix as an exponentially weighted covariance of the time series of the products of historical factor returns and each factor return adjustment factor by the programmed processor cooperating with the memory and with software; and
    outputting the factor-factor covariance matrix as an electronic output by an output device.

2. The method of claim 1 where the output factor-factor covariance matrix is used in computing the volatility of a portfolio of assets.

3. The method of claim 1 where the output factor-factor covariance matrix is used to rebalance an investment portfolio.

4. The method of claim 1 where the output factor-factor covariance matrix is used in a performance attribution analysis.

5. The method of claim 1, wherein a number of consecutive overlapping segments, N, are formed; and a ratio of two consecutive scaling factors $\delta_n$ and $\delta_{n-1}$ varies no more than 10% or $0.9 \leq \delta_n/\delta_{n-1} \leq 1.1$, for $n=2, \ldots, N$.

6. The method of claim 1, wherein the interpolation approach is cubic spline interpolation.

7. A computer-based apparatus for estimating the factor-factor covariance matrix of a factor risk model comprising:
- a programmed processor cooperating with the memory and with software operating to:
  - store data for the factors to be included in the factor risk model in a memory, wherein said memory is a non-transitory computer readable media;
  - group factor returns from a time series history of factor returns to form two or more equal length segments that overlap;
  - compute a measure of volatility for each segment;
  - compute a segment adjustment factor for all segments such that the adjusted measure of volatility for each segment is calculated as a ratio of the volatility measure of the most recent segment divided by the volatility measure of the segment;
  - compute a factor return adjustment factor for each factor return employing an interpolation approach that generates a continuous interpolation of the segment adjustment factors; and
- compute each element of the factor-factor covariance matrix as an exponentially weighted variance of the time series of the products of historical factor returns and each factor return adjustment factors; and
- an output means for outputting the factor-factor covariance matrix as an electronic output.

8. The apparatus of claim 7 where the output factor-factor covariance matrix is used in computing the volatility of a portfolio of assets.

9. The apparatus of claim 7 where the output factor-factor covariance matrix is used by the programmed processor to rebalance an investment portfolio.

10. The method of claim 7 where the output factor-factor covariance matrix is used by the programmed processor to perform a performance attribution analysis.

11. A computer-based method of estimating the variance of a factor in a factor risk model comprising the steps of:
- storing data for the factor in a memory, wherein said memory is a non-transitory computer readable media;
- determining a time series history of factor returns for the factor over a set of historical times by a programmed processor cooperating with the memory and with software;
- calculating a set of exponentially decaying weights with a fixed half life corresponding to the time series history of factor returns by the programmed processor cooperating with the memory and with software;
- computing a metric of volatility for each historical time by the programmed processor cooperating with memory and with software;
- calculating a set of volatility adjustment multipliers by the programmed processor cooperating with the memory and with software as the ratios of most recent volatility metric to the computed volatility metric;
- determining when at least one volatility adjustment multiplier is outside a predetermined range;
- adjusting the at least one volatility adjustment multiplier to a value in the predetermined range;
- computing the factor-factor covariance for the time series of factor returns using the volatility adjustment multipliers within the range and any adjusted volatility adjustment multipliers for any volatility adjustment multipliers determined to be outside the range by the programmed processor cooperating with the memory and with software; and
- outputting the factor variance as part of a factor risk model as an electronic output by an output device, wherein the predetermined range extends from 0.80 to 1.25.

* * * * *